Oct. 1, 1968

A. SUTARUK 3,403,764

FLUID COUPLING

Filed Feb. 14, 1966

INVENTOR

ALEX    SUTARUK

BY *Hoffmann and Yount*

ATTORNEYS

INVENTOR
ALEX SUTARUK
BY Hoffmann and Young
ATTORNEYS

United States Patent Office 3,403,764
Patented Oct. 1, 1968

3,403,764
FLUID COUPLING
Alex Sutaruk, Hazel Park, Mich., assignor to Eaton Yale
& Towne Inc., Cleveland, Ohio, a corporation of Ohio
Filed Feb. 14, 1966, Ser. No. 527,255
8 Claims. (Cl. 192—58)

ABSTRACT OF THE DISCLOSURE

The fluid coupling includes input and output coupling members drivingly connected to a variable speed drive and an accessory to be driven, respectively. The coupling members have spaced opposed shear surfaces which cooperate with a viscous shear fluid therebetween to transmit torque between the coupling members. The output coupling member according to one embodiment of the invention has a pair of radial movable pumping members which move radially outwardly of the output coupling member by centrifugal force when the speed of the output coupling member exceeds a predetermined speed and pumps fluid from the shear space to reduce the torque transmitted and in turn the speed of the output coupling member. The pumping elements are biased to their nonpumping position by spring means which bias is overcome by the centrifugal force at the predetermined speed. In another embodiment of the invention a separate radially extending fluid passageway is provided in the output coupling member and the pumping element is mounted for radial movement in an adjacent radial passageway so that when the speed of the output coupling member exceeds a predetermined speed the pumping abutment moves radially outwardly of the output coupling member and pumps fluid from the shear space into the reservoir through the adjacent fluid passageway to reduce the fluid in the shear space between the coupling members. In a further embodiment of the present invention, a fixed pumping abutment is provided on the periphery of the output coupling member and a ball valve normally seated in a radially extending passageway adjacent the fixed pumping abutment is unseated by centrifugal force at a predetermined speed to open the passageway and permit fluid to be pumped from the shear space into the fluid reservoir.

The present invention relates to fluid couplings of the type embodying a fluid shear medium for transmitting torque between relatively rotatable input and output coupling members, and particularly, to a shear-type fluid coupling wherein the amount of the fluid medium transmitting torque between the rotatable members can be varied to control the speed of the output member.

It is a principal object of the present invention to provide a new, improved, simple, compact and highly reliable viscous fluid coupling constructed so that the fluid medium transmitting torque between the input and output members of the coupling can be readily varied to maintain the speed of the output member substantially constant even though the speed of the input member varies.

Another object of the present invention is the provision of a new and improved fluid coupling wherein a viscous shear fluid medium is disposed in a working chamber between cooperating shear surfaces on the input and output coupling member and transmits torque between the members and including a reliable mechanism for moving fluid between the working chamber and a reservoir chamber to vary the volume of fluid in the working chamber to thereby maintain the speed of the output member substantially constant.

Still another object of the present invention is the provision of a new and improved fluid coupling having a radially movable element carried on the output member and which is movable in a first radial direction to effect fluid flow from the working chamber to the reservoir chamber and in a second radial direction opposite the first radial direction to allow for flow of fluid into the working chamber from the reservoir chamber.

An additional object of the present invention is the provision of a new and improved fluid coupling, as noted in the next preceding paragraph, wherein the movable element is moved in the first radial direction in response to centrifugal force when the output member is rotating at a predetermined speed and is biased in the second radial direction to permit fluid flow from the reservoir to the working chamber.

A further object of the present invention is the provision of a new and improved viscous fluid coupling having a working chamber having shear fluid therein for transmitting torque between the input and output coupling members, and wherein the volume of shear fluid in the working chamber is varied by the cooperative action of a pumping element fixed to the output member and projecting into the working chamber and a valve element located adjacent the pumping element and which moves radially in response to centrifugal force and when so moved opens a fluid passageway through which fluid is directed from adjacent the pumping element into a reservoir chamber.

A still further object of the present invention is the provision of a new and improved viscous fluid coupling having a working chamber located between input and output coupling members and shear fluid located in the working chamber is effective to transmit torque between the input and output coupling members and which includes means for varying the volume of fluid in the working chamber including a pumping element carried by the output member and movable radially relative thereto into the working chamber in response to centrifugal force acting on the pumping element when the output coupling member reaches a predetermined speed.

A further object of the present invention is the provision of a new and improved fluid coupling wherein a speed responsive fluid impact or pumping element carried on the output coupling member is moved into the working chamber to effect fluid flow therefrom in response to the output member attaining a speed in excess of a predetermined speed and is withdrawn from the working chamber by a spring as the speed of the output member decreases and is fully retracted from the working chamber as the speed of the output member approximates the predetermined speed.

A still further object of the present invention is the provision of a new and improved fluid coupling, as noted in the next preceding paragraph, wherein the movable pumping element has an inclined surface on the periphery thereof and which is effective when moved into the working chamber to establish a high fluid discharge pressure in the working chamber such that the fluid is directed through a fluid passageway therein and which also provides a high degree of modulation of the rate of fluid discharge from the working chamber as the pumping element withdraws from the operating chamber.

Further objects, novel characteristics, and advantages of the present invention will become apparent from the following detailed description of the present invention made with reference to the accompanying drawings forming a part of this specification and in which.

Figure 3:
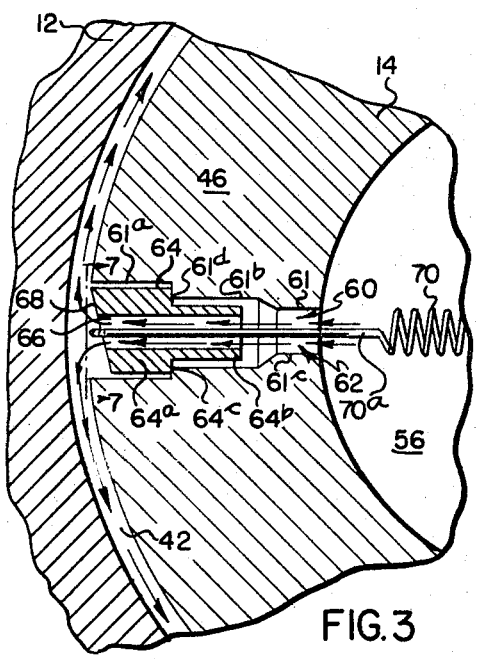
FIG. 3 is a fragmentary sectional view of a portion of the fluid coupling shown in FIG. 2 on a larger scale.
Figure 7:
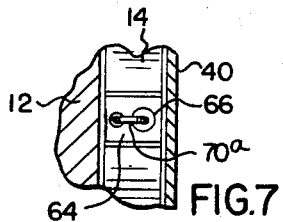
Figure 8:
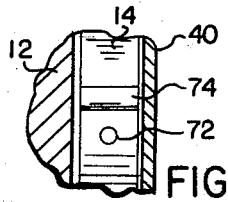
Figure 9:
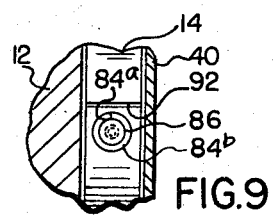
Figure 5:
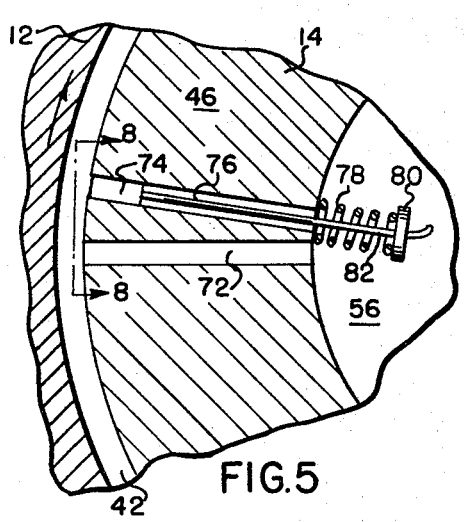
FIG. 5 is a fragmentary sectional view similar to FIGS. 3 and 4 and showing a modified form of fluid coupling embodying the present invention.
Figure 6:
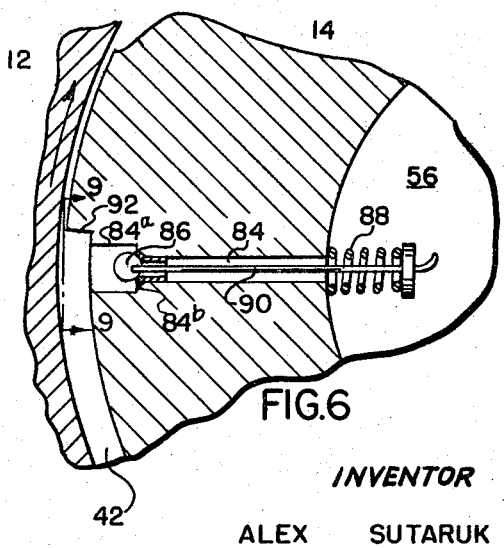

FIG. 6 is a fragmentary sectional view of a portion of a further modified form of fluid coupling embodying the present invention; and FIGS. 7, 8 and 9 are elevational views of a portion of the coupling looking in the directions of arrows 7—7, 8—8, and 9—9 in FIGS. 3, 5 and 6 respectively.

The present invention provides, in general, a fluid coupling wherein a viscous shear fluid medium cooperates with input and output coupling members to transmit torque therebetween and wherein the volume of the fluid medium cooperating with the input and output members can be varied to vary the torque transmitted to the output member. The coupling of the present invention can be used to drive any type of mechanism, for example a compressor, that is intended to operate at a substantially constant speed and which is driven by a prime mover whose speed of operation varies. It is to be understood, however, that the novel construction of the preferred embodiment of the present invention is not limited to any particular use.

As representing a preferred embodiment of the present invention, a fluid coupling 10 is shown in the drawings and includes an input coupling member 12 and an output coupling member 14. The output coupling member 14 is carried on a driven or output shaft 16 which is adapted to be drivingly connected to the drive shaft of the mechanism to be driven through the coupling 10. The output shaft 16 has a reduced portion 20 at one end thereof and on which the output coupling member 14 is fixedly mounted. The output coupling member 14 is secured to the output shaft 16 by flaring the retaining flange 22 over a hub portion 24 of the output coupling member 14.

The input coupling member 12 is adapted to be driven from a speed prime mover by a suitable drive arrangement, not shown, but which may include a drive mechanism such as a pulley secured to the input member 12. The input coupling member 12 is mounted for rotation relative to output shaft 16 by a ball bearing assembly 32. The inner race of the ball bearing assembly 32 is securely mounted on a reduced shaft portion 34 intermediate the hub 24 of the output coupling member 14 and the end of the output shaft 16. The outer race of the ball bearing assembly 32 is received in a hub portion 36 of the input coupling member 12.

The input coupling member 12 includes a main input member or casing 12a which has a recess or bore 38 formed therein. The recess 38 is closed by a plate 40 secured to one end of the input coupling member 12. The recess or bore 38 and the plate 40 cooperate to form a substantially fluid-tight operating or working chamber 42 within which the output coupling member 14 rotates. The output coupling member 14 is generally disc-shaped and has an outer portion 46 which extends radially from the hub portion 24. The outer portion 46 of the disc-shaped output member 14 has surfaces 48a, 48b and 48c which lie closely adjacent to and are spaced from faces 50a and 50b defining part of the bore 38 and interior surface 40c of cover 40, respectively. The opposed surfaces 48a and 50a define therebetween a shear space 52a and have a cooperating plurality of interdigitated grooves and lands indicated generally as 54. These grooves and lands provide opposed surfaces extending in close parallel face-to-face relation and define part of the shear space therebetween. Opposed surfaces 48b and 50b and 48c and 40c define therebetween shear spaces 52b and 52c, respectively. Upon rotation of the input coupling member 12, the fluid in the fluid operating chamber 42 and specifically the fluid in the above-mentioned shear spaces transmits torque between the input and output members by the shear action of the fluid.

The amount of torque transmitted from the input coupling member 12 to the output coupling member 14 is a function of the volume of fluid in the chamber 42 and, specifically, in the abovementioned shear space. It should be apparent from the above description that if there is no fluid in the chamber 42 and consequently no fluid in the shear space there would be no torque transmitted between the input and output members, and as the fluid volume in the chamber 42 increases, the torque transmitted between the input and output members increases and the speed differential between the members is decreased.

In order to vary the volume of fluid in the chamber 42 and thus vary the torque transmitted and the speed differential between the input and output members, the fluid coupling 10 includes a means providing for flow of fluid into and from the chamber 42. The fluid supplied to the chamber 42 flows thereinto from a fluid reservoir or storage chamber 56 and the fluid leaving the chamber 42 flows back into the reservoir or storage chamber 56. The fluid reservoir chamber 56 is adjacent working chamber 42 and is formed by the output coupling member 14. The chamber 56 is defined by a portion of the radially extending disc of the output coupling member 14 and by a generally circular-shaped partition member 58 which forms a portion of the output coupling member 14. The outer peripheral edge of the partition member 58 is secured to the outer portion 46 of the output coupling member 14.

Figure 1:
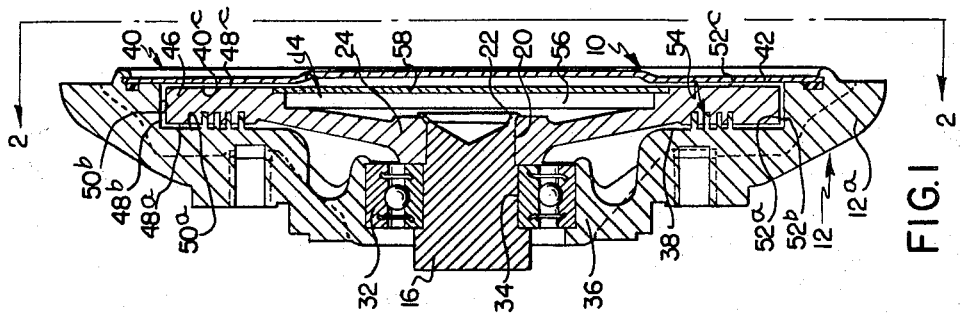
FIG. 1 is an axial sectional view of a fluid coupling embodying the present invention.
Figure 2:
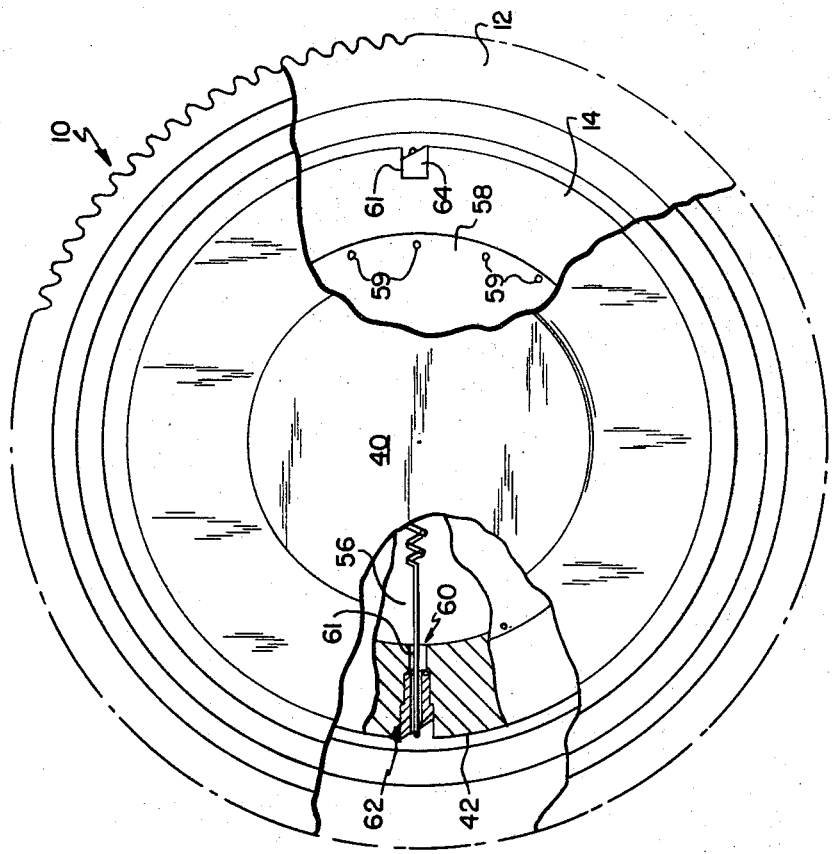
FIG. 2 is an elevational view partly in section of the fluid coupling of FIG. 1 looking at the fluid coupling of FIG. 1 in the direction of the arrows 2—2.

The means providing for fluid flow between the reservoir or storage chamber 56 and the fluid working chamber 42 includes fluid conducting means generally designated as 60 (FIG. 2) and communicating the reservoir chamber 56 with the working chamber 42 and a flow control mechanism 62 operable to effect fluid flow through the fluid conducting means 60. The flow control mechanism 62 is operable when the speed of rotation of output shaft 16 exceeds a predetermined speed to effect fluid flow from the working or operating chamber 42 into the reservoir chamber 56 to thereby increase the speed differential between input member 12 and output member 14. When the output shaft 16 is rotating below the predetermined speed, the flow control mechanism 62 allows for fluid flow into the chamber 42 to increase the torque transmitted between the input and output members as will be apparent from the description below.

Figure 4:
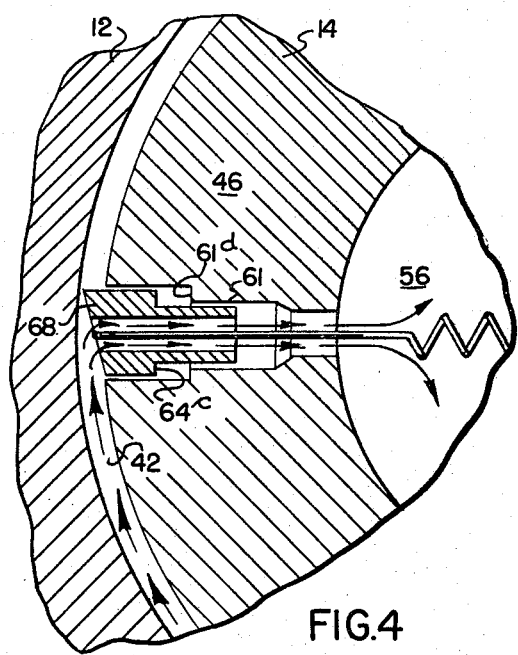
FIG. 4 is a fragmentary view of the portion of the fluid shown in FIG. 3 and showing the parts in a different operative position.

The fluid conducting means 60, as best shown in FIGS. 3 and 4, comprises a plurality of openings 61 extending radially through the outer portion 46 of the output member 14. Each opening 61 has a large, intermediate and small passageway areas 61a, 61b, 61c, respectively, extending radially from the outermost periphery of member 14 toward the interior thereof. The openings are arranged in diametrically opposed relationship in the outer portion 46 of the output coupling member 14 and are adapted to receive the flow control mechanism 62 therein.

The flow control mechanism 62 comprises in the embodiment shown in FIGS. 3 and 4 separate impact type pumping elements 64 which are mounted for radial reciprocation in each opening 61. The pumping element 64 is movable from an inoperative position, illustrated in FIG. 3, and in which position fluid is permitted to flow in the manner illustrated by the arrows in FIG. 3 from the reservoir chamber 56 through the opening 61, and through an orifice 66 disposed in the pumping element 64 which orifice communicates the opening 61 with working chamber 42 to an operative position which is the position illustrated in FIG. 4 wherein the outermost portion of the pumping element extends into working chamber 42. When in the operative position, the pumping element 64 is effective to pump the fluid from the chamber 42 into the reservoir chamber 56 through the orifice 66 and opening 61, in the manner illustrated by the arrows in FIG. 4.

The pumping element 64 has a cross-sectional configuration corresponding to the cross-sectional configuration of section 61a and 61b of the opening 61. The difference in cross-sectional areas of passageway areas 61a and 61b provides an abutment 61d which limits the extent of inward radial movement of the pumping element. The pumping element 64 has an enlarged rectangular head portion 64a and a smaller cylindrical shank portion 64b and forming at their point of connection a shoulder 64c which is engageable with the abutment 61d of the opening 61 to limit the extent of radial inward movement of the pumping element 64.

The outermost periphery of the enlarged head portion 64a has an inclined fluid impacting surface 68. When the impact element 64 moves to its operative position as shown in FIG. 4 the inclined fluid impacting surface 68 extends into the operating chamber and is effective to pump fluid from the chamber 42 and the shear space 52 into the reservoir 56.

The pumping elements 64 are biased toward their inoperative position by a coil spring 70. The spring 70 includes linearly extending portions 70a at the opposite ends thereof which extend through the diametrically opposite openings 61 and the orifice 66 in the pumping elements and the ends thereof are bent over and secured in a suitable opening provided in the pumping elements 64. Hence, the diametrically opposed pair of pumping elements 64 are biased by a single spring which exerts a predetermined inward radial force on the pumping elements, urging them toward their inoperative positions.

The impact elements are moved to their operative positions in response to the output coupling member 14 reaching a predetermined speed of rotation. This movement of the impact elements occurs when the centrifugal force acting on the mass of the impact elements during rotation of the output coupling member overcomes the biasing effect of spring 70 on the impact elements. When this occurs, the pumping element moves toward its operative position and begins to pump fluid from the working chamber into the reservoir chamber. As the volume of fluid in the shear space is reduced, the torque transmitted between the input member 12 and the output member 14 is reduced and in turn the speed of the output coupling member 14 is reduced. The pumping elements 64 retract radially inwardly as the speed of the output member reduces. The output coupling member continues to slow down until it reaches a speed approximately at its desired operational speed and at which speed the centrifugal force acting on the pumping elements 64 is slightly less than the force exerted thereon by the spring 70 causing the pumping elements to be retracted into the openings 61 and the pumping action is terminated. If the input member decreases in speed of rotation below that for maintaining the desired constant output speed fluid begins to flow from the reservoir chamber through openings 61 and orifices 66 into the working chamber and into the shear space between the coupling members due to the differential fluid pressures existing in the working and fluid reservoir chambers. This tends to maintain the speed of the output member even though the speed of the input member decreases slightly. It should be apparent from the above that the pumping elements operate to maintain the output member 14 and in particular output shaft 16 rotating at a substantially constant predetermined speed.

The wedge-type configuration provided by surface portion 68 of the pumping elements 64 provides for maximum pressure to be exerted on the fluid in the working chamber adjacent orifice 66 when the pumping element is in its pumping position to cause faster evacuation of the fluid through the central opening 66 of the pumping element 64. The wedge shape also provides a greater modulation of the rate of fluid discharge through the opening 66 as the pumping elements are gradually withdrawn into opening 61. This, of course, minimizes the variation in speed of the output shaft 16.

Additional means are provided for communicating the reservoir chamber and the working chamber to provide continuous bleed-back of fluid from the reservoir chamber to the working chamber to prevent stalling out of the output member. This means includes a plurality of openings 59 in the plate 58 forming one wall of the fluid reservoir chamber 56 and the fluid can flow through these openings at all times and assures a minimum fluid volume in the shear area. These openings also provide the necessary fluid in chamber 42 for starting.

The present invention contemplates a modified means, shown in FIG. 5, for controlling the volume of fluid in the shear spaces between the input and output members. The parts of the coupling shown in FIG. 5 which are identical to the coupling parts shown in FIGS. 1–4 have been given identical reference numerals in the description of this modification hereinbelow. Referring to FIG. 5, the means for communicating the reservoir chamber 56 with the working chamber 42 includes a plurality of radially extending orifices 72 formed in the outer portion 46 of the output coupling member 14 and through which the fluid is directed as it flows between chambers 42 and 56.

The means for controlling the volume of fluid in working chamber 42 and thereby in shear space 52 includes radially movable pumping elements 74 one of which is associated with each of the orifices 72. Each pumping element is slidably mounted in a radially extending opening 76 in the outer portion 46 of the output coupling member 14. The impact or pumping member 74 is biased to its inoperative position which is the position shown in FIG. 5 by a spring 78 which abuts at one end against the output coupling member 14 and at the other end against an enlarged end portion 80 of a rod 82 which is fixedly secured to the pumping element 74.

When the output member 14 is rotating at or below a predetermined speed, the impact element 74 is maintained in its inoperative position by the spring 78 and the fluid can move from the reservoir chamber 56 through orifice 72 into the working chamber 42 to increase the torque transmitted from the input member 12 to the output member 14 if the speed of the input member decreases slightly from the desired constant predetermined speed. If the speed of rotation of the output member 14 exceeds the predetermined speed, the weight of the impact element is such that the centrifugal force acting thereon overcomes the biasing effect of spring 78 and the impact element 74 moves into the working chamber 42 which is the operative or pumping position of the impact element 74. When the impact element 74 is in its operative position, fluid is impacted against the surface thereof facing the orifice 72 creating a back pressure on the fluid due to the relative rotation between the input and output members. This back pressure directs the fluid from the working chamber 42 through the orifice 72 into the reservoir 56 and thereby reduces the torque transmitted from the input member 12 to the output member 14 by reducing the fluid volume in the shear space. This action causes the output member 14 to reduce in speed which likewise reduces the centrifugal force acting on the impact element 74 and the impact element begins retracting into the opening 76. When the output member 14 rotates at or slightly below the predetermined speed at which the output member is desired to be operated, the impact element is withdrawn completely from the chamber 42 and the pumping of fluid from the working chamber 42 to the reservoir 56 stops. Although the impact element 74 has been illustrated as being generally rectangular in configuration, it should be appreciated that the outermost periphery thereof could be inclined such as surface 68 of the impact element 64 shown in FIGS. 3 and 4.

A still further modification of the coupling device of the present invention is contemplated and this modification is disclosed in FIG. 6 wherein parts similar to the parts shown in FIGS. 1–4 will be identified with identical reference numerals. Referring to FIG. 6, the means providing fluid communication between the fluid reservoir chamber 56 and the working chamber 42 comprises fluid passageways 84 having an enlarged outer portion 84a adjacent the periphery of the output coupling member 14. A valve seat 84b which is adapted to receive a ball-type valve element 86 is provided in each orifice. The valve seat 84b may comprise a surface of the coupling member or may comprise a separate insert member. The ball valve element 86 constitutes a flow producing means and is biased into engagement with the seat 84b by means of a spring 88 which acts between the end of an actuator rod 90 and the output coupling member 14. When the member 86 is in the position illustrated in FIG. 6, fluid flow from the working chamber 42 into the reservoir 56 is prevented.

In this modification, a series of fixed abutments or impacting pump members 92 are disposed circumferentially about the periphery of the output coupling member 14. The fluid impact pump members lead the orifices 84 in the direction of rotation of the coupling members and creates a pressure on the fluid adjacent to the orifices 84 due to the fact that it rotates slower than the input member.

During operation of the coupling wherein the output coupling member is rotating at or below a predetermined speed, the spring 88 is effective to maintain the ball valve 86 in seating engagement with the valve seat 84b formed in the output coupling member 14 preventing flow of fluid from the working chamber 42 into the reservoir chamber 56. When the output member 14 exceeds the predetermined operational speed, the ball valve element moves out of engagement with the seat 84b against the bias of spring 88 and the fluid in the working chamber 42 which has a back pressure exerted thereon due to the abutments 92 flows about the ball 86 through the orifice 84 into the reservoir chamber 56. This action continues until the output member is operating at the desired speed, at which time the ball valve element will again be seated by the spring 88 and the fluid will not be pumped out of the working chamber 42. When the speed of the input member decreases slightly from that to maintain the desired output speed, fluid flows into working chamber 42 through openings 59, not shown in FIG. 6. Although a ball-type valve element has been illustrated in connection with the modification disclosed in FIG. 6, it should be apparent that other suitable types and configurations of valves could be employed.

From the above, it should be apparent that the various modifications of the fluid coupling embodying the present invention operate to maintain a substantially constant output speed above a predetermined speed. Each of the modifications includes a radially movable element, namely, the pumping elements 62, 74 in the modifications disclosed in FIGS. 3 and 5, and the ball valve member 86 in the modification disclosed in FIG. 6. These elements are carried on the output coupling member 14 and move radially outwardly in response to centrifugal force acting thereon at a predetermined speed. When the elements move radially outwardly, fluid flows from the working chamber of the coupling to the reservoir chamber and speed of the output coupling member is reduced. These elements each then retract as the output speed of the coupling slows and at the desired output speed, flow of fluid from the working chamber to the reservoir chamber stops. If the speed of the input member decreases slightly, fluid flows into the working chamber so as to maintain the output speed without change. Thus, each of the devices is effective to maintain a substantially constant speed of the output member of the fluid coupling, even though the input member thereof may be driven at different or varying speeds.

Further from the above, it should be apparent that the preferred embodiments of the present invention have been described in considerable detail and certain modifications, changes, and adaptations may be made therein by those skilled in the art to which it relates and it is hereby intended to cover all modifications, changes and adaptations thereof falling within the scope of the appended claims.

Having described my invention, I claim:

1. A fluid coupling comprising an input rotatable member, an output rotatable member disposed adjacent said input member, said rotatable members having spaced opposed surface portions defining therebetween a shear space and cooperable with a fluid shear medium within said shear space to provide a shear-type fluid drive between said members, a fluid reservoir chamber adjacent said shear space, fluid conducting means communicating said reservoir chamber and said shear space and providing for fluid flow from said reservoir chamber to said shear space, fluid flow control means including flow producing means supported on said output member and movable from an inactive position in response to said output member achieving a speed in excess of a predetermined speed to an active position effective to establish fluid flow from said shear space through said fluid conducting means into said fluid reservoir chamber to decrease the speed of the output member, and spring means for moving said flow producing means to said inactive position as the speed of said output member decreases and approaches the predetermined speed.

2. A fluid coupling as defined in claim 1 wherein said flow producing means includes a movable pumping element and further includes means mounting said pumping element for radial movement.

3. A fluid coupling as defined in claim 2 wherein said fluid conducting means includes a radially extending opening in said one member and said pumping element is operatively associated with said opening whereby radial movement of said flow producing means establishes fluid flow through said opening.

4. A fluid coupling as defined in claim 1 wherein said flow producing means includes a valve element and means mounting said valve element for radial movement in response to centrifugal force to permit fluid flow from said shear space to said reservoir chamber.

5. A fluid coupling comprising an input coupling member defining a fluid operating chamber, an output coupling member having at least a portion of the periphery thereof rotatable in said fluid operating chamber, said input and output coupling members having spaced opposed shear surface portions defining therebetween a shear space and cooperable with a fluid shear medium within said shear space to provide a shear-type fluid drive between said coupling members, said output coupling member defining a fluid reservoir chamber, fluid passageway means in said output coupling member and communicating said reservoir and fluid operating chambers, pumping means on said output coupling member and operatively associated with said fluid passageway means and movably radially thereof between an inoperative position allowing for fluid flow through said fluid passageway means from the reservoir chamber to the operating chamber and an operative position in which at least a portion of said pumping means is disposed in said operating chamber and effective to pump fluid from said operating chamber into the reservoir chamber through said fluid passageway means, means biasing said pumping means toward said inoperative position and means mounting said pumping element for radial movement toward said operative position in response to said output member rotating at a predetermined speed.

6. A fluid coupling comprising a first rotatable coupling member defining a working chamber, a second rotatable coupling member having at least a portion of the periphery thereof movable in said working chamber, said first and second coupling members having spaced opposed surface portions defining therebetween a shear space and cooperable with a fluid shear medium within said shear space to provide a shear-type fluid drive between said coupling members, a fluid reservoir chamber adjacent said working chamber, a fluid conducting means communicating said reservoir chamber and said shear space and providing for fluid flow therebetween, flow control means including a pumping element supported by one of said coupling members and movable radially between an operative position effective to remove fluid from said shear space into said fluid reservoir chamber and an inoperative position permitting fluid flow from said fluid reservoir chamber into said shear space, and further including means biasing said pumping element to said inoperative position, and wherein said fluid flow control means includes at least one pair of pumping elements movable radially, and wherein said biasing means is connected to the elements of each pair to bias said pumping elements toward their said inoperative positions.

7. A fluid coupling comprising a first rotatable coupling member defining a working chamber, a second rotatable coupling member having at least a portion of the periphery thereof movable in said working chamber, said first and second coupling members having spaced opposed surface portions defining therebetween a shear space and cooperable with a fluid shear medium within said shear space to provide a shear-type fluid drive between said coupling members, a fluid reservoir chamber adjacent said working chamber, a fluid conducting means communicating said reservoir chamber and said shear space and providing for fluid flow therebetween, flow control means including a pumping element supported by one of said coupling members and movable radially between an operative position in which fluid is pumped into said fluid reservoir chamber and an inoperative position in which fluid may flow from said fluid reservoir chamber into said shear space, said fluid conducting means comprising a radially extending opening providing communication between said fluid reservoir chamber and said shear space and said pumping element being movably supported within said opening and effective when in said inoperative position to block fluid flow between said pumping element and said opening, said pumping element further including means defining a radially extending fluid passageway extending therethrough and an inclined surface along the outermost periphery which is effective during movement of said pumping element outwardly of said opening to form a fluid impact surface which creates a back pressure on the fluid in the shear space directing the fluid through said passageway into said reservoir chamber.

8. A fluid coupling comprising an input rotatable member, an output rotatable member disposed adjacent said input member, said rotatable members having spaced opposed surface portions defining therebetween a shear space and cooperable with a fluid shear medium within said shear space to provide a shear-type fluid drive between said members, a fluid reservoir chamber adjacent said shear space, fluid conducting means communicating said reservoir chamber and said shear space and providing for fluid flow from said reservoir chamber to said shear space, fluid flow control means supported on said output member and actuatable from an inactive condition in response to said output member achieving a speed in excess of a predetermined speed to an active condition effective to establish fluid flow from said shear space through said fluid conducting means into said fluid reservoir chamber to maintain the speed of the output member at approximately said predetermined speed, and means for actuating said flow producing means to said inactive condition when the speed of said output member reaches said predetermined speed.

References Cited

UNITED STATES PATENTS 3,228,382   1/1966   Stefan _____ 123—41.12
3,259,220   7/1966   Roper _____ 192—58

FRED C. MATTERN, Jr., *Primary Examiner.*

ARTHUR T. McKEON, *Assistant Examiner.*